Patented June 4, 1946

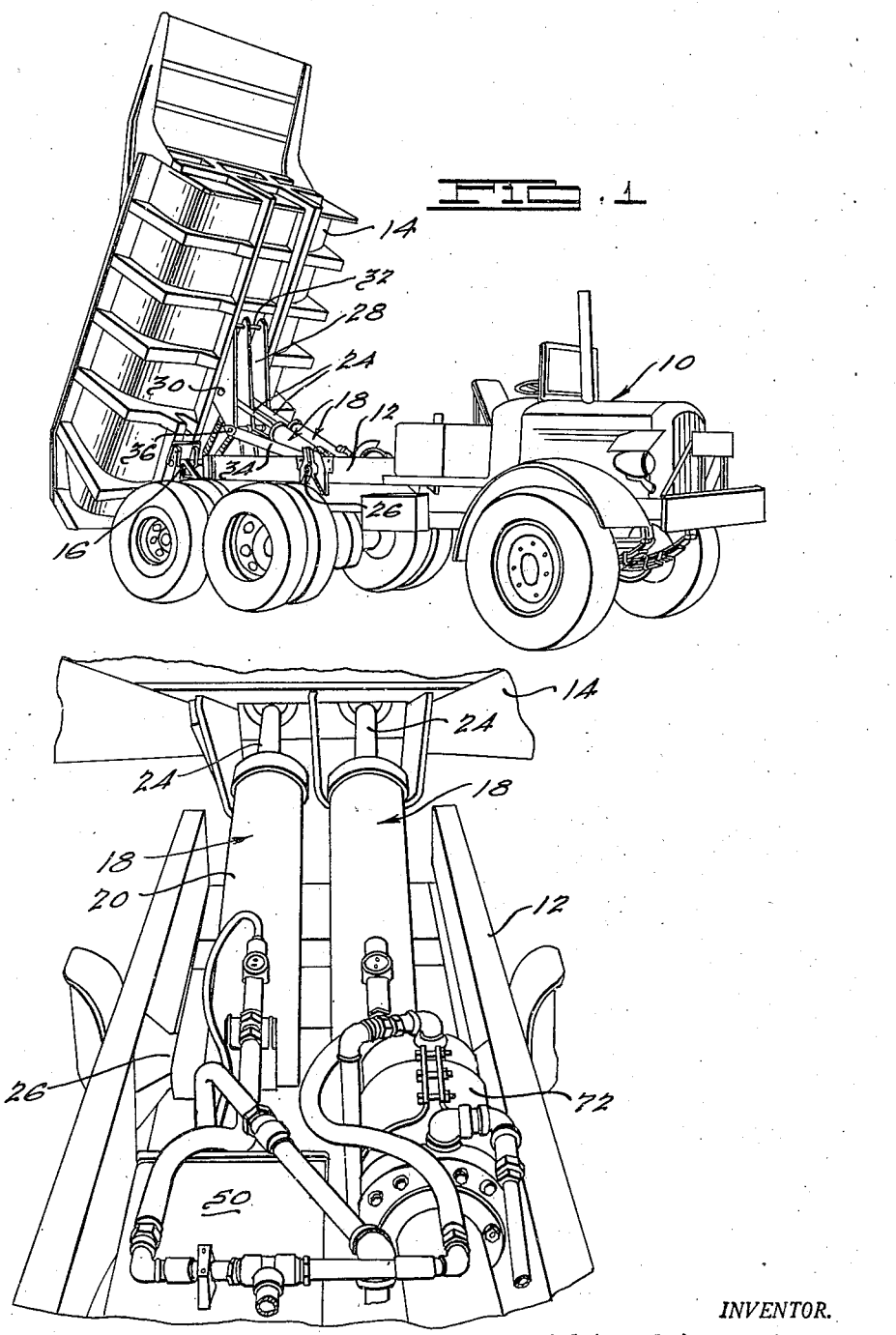

2,401,498

UNITED STATES PATENT OFFICE 2,401,498

DUMP TRUCK HYDRAULIC CONTROL

John C. Monahan, Detroit, Mich., assignor to Gar Wood Industries, Inc., Detroit, Mich., a corporation of Michigan Application October 18, 1943, Serial No. 506,643

2 Claims. (Cl. 60—54.5)

The present invention relates to a dump vehicle construction and particularly relates to such constructions having an improved hydraulic dump mechanism associated therewith.

The primary object of the present invention is to provide an improved hydraulic dump mechanism by which, for a given or predetermined pump pressure, the dump cylinder pressure is automatically or selectively increased during the period of the hoisting stroke when the load is greatest and is then decreased to the pump pressure for the remainder of the hoisting stroke.

Other objects of the invention will become apparent from the following specification, the drawings relating thereto and from the claims hereinafter set forth.

In the drawings, in which like numerals are used to designate like parts in the several views throughout:

Figure 1 is a side, perspective view of a dump truck embodying features of the present invention and showing the body in its raised position;

Fig. 2 is a top, perspective view of the hoist mechanism and showing such hoist mechanism in its association with the chassis and body; and, Fig. 3 is a diagrammatic view of the hydraulic control or power transmission system of the present invention.

Figure 3:
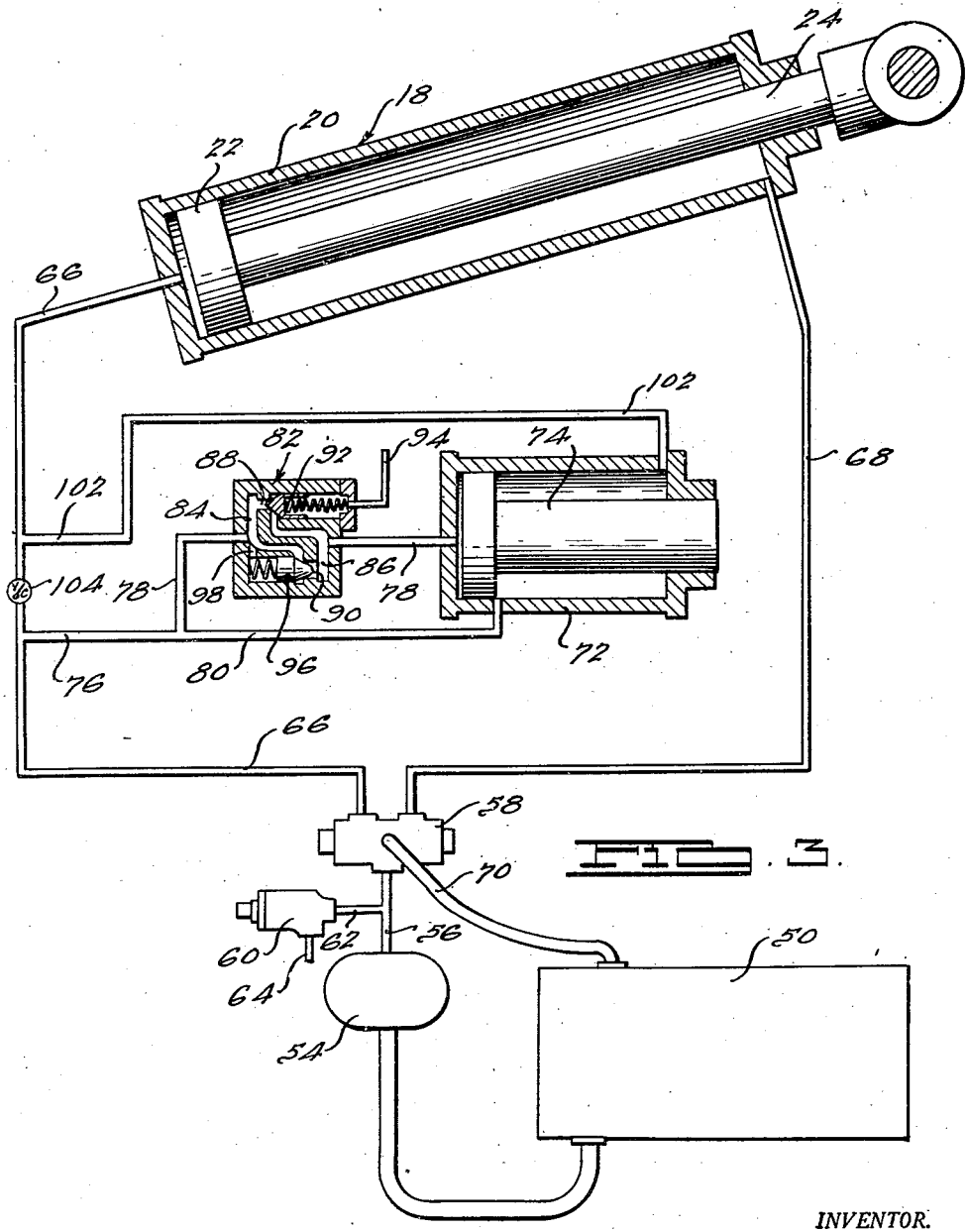

In the operation of dump trucks, practically all hoists develop high pressures at the beginning of the stroke and lower pressures at the end of the stroke. This is partly due to inertia, but mostly due to adverse leverage and load. According to the present invention, a pressure booster, in the form of a differential piston fluid motor, is installed in the high pressure line with control means to automatically increase the work cylinder pressure without exceeding a predetermined or given pump pressure. The volume output from the booster need only be enough to raise the load initially 10° to 15°. Thereafter, the body is moving and as it moves the leverages are much more favorable so that the lower pump pressure can handle the load without assistance.

Referring to the drawings, a dump truck is generally indicated at 10 and includes the usual chassis 12, having a dump body 14 pivotally mounted adjacent the rear end of the chassis by means of a rear pivot 16. Hydraulic jacks, generally indicated at 18, are provided for hoisting or raising the body and such jacks may be connected to the body and to the chassis by structures such as those disclosed in the copending application of Louis S. Wood, Serial No. 418,115, filed November 7, 1941. Such hoisting means is shown by way of illustration, and it will be understood that other connections including the hydraulic jack may be employed within the scope of the present invention.

In the embodiment illustrated, two jacks are employed but a single jack could be used within the scope of the present invention.

The jacks 18 include cylinders 20 having a piston 22 slidably disposed therein and having a piston rod 24 disposed to pass through the cap end of the cylinder. The lower ends of the cylinders 20 are pivotally connected to the chassis by pivots indicated at 26. In the embodiment illustrated, the outer ends of the piston rods 24 are pivotally connected to a lever member 28 by means of a pivot 30, located intermediate the ends of the lever 28. The forward ends of the lever 28 are pivotally connected to the body, as indicated at 32. Links 34 are pivotally connected to the opposite ends of the lever member by pivots 36; and the opposite ends of the links 34 are pivotally connected to pivots 26. The structure so far described is substantially the same as that disclosed in the above-mentioned Wood application, except that here two cylinders are employed, rather than the one there disclosed.

It will be understood that as fluid is introduced into the inlet or lower ends of jacks 18, that the piston rods 24 are extended to raise the body, as shown in Fig. 1.

Referring to Fig. 3, the hydraulic power transmission system of the present invention and its association with the jacks is diagrammatically illustrated. As mentioned above, by the system of the present invention, higher unit pressures than the pump pressure are introduced into the hoist cylinder at the beginning of the stroke, for a limited period of the stroke, and thereafter the unit pressures introduced are those lower pressures directly from the pump. In the diagrammatic view illustrated only one of the jacks 18 is shown, but it will be understood that the two jacks may be fed from the branch conduits leading from the inlet line.

The system includes a tank or reservoir 50, having an outlet conduit 52 communicating with the interior of the tank 50 through the bottom thereof and communicating with the inlet of a constant delivery gear pump 54. A conduit 56 communicates with the outlet of the pump with a port of a four-way valve 58. Such four-way valve is of conventional construction.

An overload relief valve 60, having a conduit 62 associated with the conduit 56 and having another conduit 64 returning to the tank or returning to the pump 54 may be provided in the usual way.

Another conduit 66 communicates with another port in valve 58 and also communicates with the pressure inlet to cylinder 20 through the lower end of such cylinder. A return conduit 68 communicates with the outlet to cylinder 20 adjacent the cap end thereof and also communicates with a port in valve 58. A return conduit 70 communicates with another port in valve 58 and returns to the tank 50. That much of the system so far described is conventional hydraulic hoist structure. It will be understood that with the valve 58 in one position, fluid under pressure is introduced to the lower end of cylinder 20, causing the body to be raised and fluid within the cylinder is then exhausted through conduit 68 and returns to the tank through valve 58 and conduit 70. The predetermined or given pressure developed by the pump is the maximum pressure delivered to the work cylinder 20 and the disadvantages mentioned above are present.

According to the present invention, a booster in the form of a differential piston, fluid motor comprising a cylinder 72 and a differential piston 74, is inserted in the system. The differential piston 74 is constructed and proportioned to give the desired difference in unit pressures and the length of the cylinder is such as to displace the desired volume for actuating the work cylinder over a desired period of time, or length of its stroke. A conduit 76 having branch conduits 78 and 80 communicates with conduit 66. Conduit 80 communicates with the interior of cylinder 72 adjacent the inlet end of such cylinder but spaced slightly therefrom a distance slightly greater than the width of the piston, as illustrated. Conduit 78 communicates through the bottom or piston end of cylinder 72.

A control valve generally indicated at 82 is inserted in conduit 78. Such valve 82 has main passages 84 and 86 formed therein, such passages being communicable with each other through passageways 88 and 90. Communication between passages 84 and 86 through passageway 88 is controlled by means of a spring valve 92, which may be adjusted to open at a predetermined pressure. The space behind valve 92 may be exhausted to the tank through an exhaust conduit 94. A check valve 96 controls communication between passages 84 and 86 through passage 90 and is spring-urged in the direction shown. The space behind check valve 96 communicates with passage 84 by means of passage 98. Passages 84 and 86 are connected in conduit 78, as shown.

A conduit 102 communicates with cylinder 72 adjacent the cap end thereof and also communicates with conduit 66. A check valve 104 is inserted in conduit 66 between the points of communication of conduits 76 and 102, and is constructed to check the flow of fluid back to the pump.

In the operation of the structure above described, let it be assumed that the pump 54 is operated at its given or predetermined or normal unit pressure and that the valve 58 is set so that such fluid under pressure flows from conduit 56 into conduit 66. With the valve 82 designed or set to open at a predetermined pressure, the fluid at that normal pressure enters conduit 78 and passes into passageway 84 where it will unseat valve 92, if the pressure to open such valve has been reached, and pass through passageway 86 into conduit 78 and into cylinder 72. The same pressure is effective through conduit 80 on the small area side of the piston but such piston will be moved to the right (viewing Fig. 3) in view of the larger effective area on the opposite side of the piston. As the differential piston 74 moves to the right, the higher unit pressures are developed on the small area side of the piston and such higher unit pressures are effective through conduit 102, close check valve 104, and pass through conduit 66 into the inlet of cylinder 20. The piston 22 will be moved to hoist the body at such high unit pressures until the piston 74 reaches the end of its stroke. At such time, the higher unit pressures will be no longer developed and the fluid will flow directly through check valve 104 at the given or predetermined pump pressures directly to the inlet to cylinder 20 and the piston rod 24 will be extended to the end of its stroke at the pump pressure.

To return the body to its lower position, or to permit the piston 22 to return to its initial position, the valve 58 may be shifted so that the pump pressure is introduced to cylinder 20 through conduit 68. The fluid on the underside of piston 22 then returns through conduit 66 and into conduit 102 (being checked against direct return by check valve 104) and into cylinder 72. This first causes movement of the differential piston 74 to the left (viewing Fig. 3) until it reaches its initial position. The fluid within chamber 72, during the return of the differential piston 74 to its initial position, may exhaust through conduits 78 and 80 and return to the tank through conduit 66, valve 58 and conduit 70. In the last portion of stroke, oil flows through conduit 86, check valve 96, and conduit 84. In exhausting through conduit 78, the check valve 96 is unseated, communicating passageways 84 and 86 through passage 90. When the differential piston 74 is in its initial position, the remainder of the fluid from cylinder 20 exhausts through conduit 80, which is open to the interior of cylinder 72, as shown in Fig. 3.

From the structure and operation above described, it will thus be seen that during the initial stage of hoisting, the unit pressures developed by the differential piston are increased over the pump pressures so that the work cylinder may be operated at these higher unit pressures during the initial stages of hoisting. The extent of the increase may be predetermined according to the relative areas of the opposite sides of differential piston 74.

Since the valve 92 is spring loaded, it will not be opened until the pressure exceeds a predetermined amount. Thus, in certain instances, for example, for a light, unloaded body, the flow from the pump would be directly through the check valve 104 to jack 18. Such flow would continue until resistance to movement of jack 18 builds up a pressure in excess of the predetermined setting of valve 92, when the fluid would then pass through the booster as in the cycle described above. If the peak pressure does not occur at the beginning of the first stroke, the valve 92 may be set, or designed so that it does not open until the peak load is approached. The operation then is to direct the fluid first to the jacks 18, then through the booster 72, and then directly to the jacks 18.

It is also pointed out that the valve 82 may be omitted from conduit 78. When so omitted, the fluid from the pump will always pass first through the booster 72 at the initial stages of hoisting.

What is claimed is:

1. In an hydraulic control system, a work cylinder and piston assembly having a piston end and a rod end, a fluid pump, a fluid conduit interconnecting the outlet of said pump with the piston end of said cylinder, a check valve in said conduit operative to prevent the return of fluid to said pump, a differential piston fluid motor having a low pressure inlet adjacent one end and a high pressure outlet adjacent the other end, said motor having a port intermediate the ends thereof, a fluid conduit interconnecting said high pressure outlet with said first named conduit between said work cylinder and said check valve, a fluid conduit interconnecting said port with said first named conduit between said pump and said check valve, a fluid conduit communicating with said last named fluid conduit and with said low pressure inlet, and a pressure opening valve in said last named conduit, the construction and arrangement of said conduits, valves and motor being such that fluid returning from said work cylinder through said first named fluid conduit returns through said second named conduit to said motor to first move the differential piston toward the low pressure end thereof.

2. In an hydraulic control system, a double acting work cylinder and piston assembly having a piston end and a rod end, a fluid pump, a fluid conduit interconnecting the outlet of said pump with the piston end of said cylinder, a check valve in said conduit operative to prevent the return of fluid to said pump, a differential piston fluid motor having a low pressure inlet adjacent one end and a high pressure outlet adjacent the other end, said motor having a port intermediate the ends thereof, a fluid conduit interconnecting said high pressure outlet with said first named conduit between said work cylinder and said check valve, a fluid conduit interconnecting said port with said first named conduit between said pump and said check valve, a fluid conduit communicating with said last named fluid conduit and with said low pressure inlet, a pressure opening valve in said last named conduit, the construction and arrangement of said conduits, valves and motor being such that fluid returning from said work cylinder through said first named fluid conduit returns through said second named conduit to said motor to first move the differential piston toward the low pressure end thereof, a reservoir, a fluid conduit connecting said reservoir with the inlet to said pump, a fluid conduit interconnecting the rod end of the work cylinder with the reservoir, and a control valve associated with said first and last two named conduits to control the flow of fluid through said conduits.

JOHN C. MONAHAN.